(12) United States Patent
Nayebi et al.

(10) Patent No.: US 11,916,392 B2
(45) Date of Patent: Feb. 27, 2024

(54) CURRENT DISPATCHING FOR POWER PLANT CONTROL

(71) Applicant: VESTAS WIND SYSTEMS A/S, Aarhus N (DK)

(72) Inventors: Kouroush Nayebi, Ikast (DK); Mu Wei, Solbjerg (DK); Torsten Lund, Fredericia (DK); Per Lund, Kolding (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 284 days.

(21) Appl. No.: 17/286,802

(22) PCT Filed: Aug. 20, 2019

(86) PCT No.: PCT/DK2019/050245
§ 371 (c)(1),
(2) Date: Apr. 19, 2021

(87) PCT Pub. No.: WO2020/078517
PCT Pub. Date: Apr. 23, 2020

(65) Prior Publication Data
US 2021/0359525 A1    Nov. 18, 2021

(30) Foreign Application Priority Data

Oct. 17, 2018  (DK) .......................... PA 2018 70677

(51) Int. Cl.
*H02J 3/38* (2006.01)
*H02J 13/00* (2006.01)
*G05B 15/02* (2006.01)

(52) U.S. Cl.
CPC .............. *H02J 3/381* (2013.01); *G05B 15/02* (2013.01); *H02J 13/00002* (2020.01); *H02J 2300/28* (2020.01)

(58) Field of Classification Search
None
See application file for complete search history.

(56) References Cited

U.S. PATENT DOCUMENTS

| 7,511,385 B2 * | 3/2009 | Jones .................. | H02M 5/4585 290/43 |
| 7,656,052 B2 * | 2/2010 | Jones ...................... | H02P 9/102 290/43 |

(Continued)

FOREIGN PATENT DOCUMENTS

| WO | 2017215719 A1 | 12/2017 |
| WO | 2020078517 A1 | 4/2020 |

OTHER PUBLICATIONS

Yuan et al., "A hybrid prediction-based microgrid energy management strategy considering demand-side response and data interruption", Dec. 2018, Electrical Power and Energy Systems 113 (2019) 139-153. (Year: 2018).*

(Continued)

*Primary Examiner* — Mohammad Ali
*Assistant Examiner* — Kelvin Booker
(74) *Attorney, Agent, or Firm* — Patterson + Sheridan, LLP

(57) ABSTRACT

Embodiments provide for the control of a power plant including several generators by setting a reference frame for the generators with a first and a second axis; measuring a grid demand voltage at the shared connection point; determining active and reactive currents required at the shared connection point based on the grid demand voltage and grid codes; transforming the active and reactive currents required at the shared connection point to the reference frame where the first axis defines a first current set point and the second axis defines a second current set point; and dispatching the first and second current set points to generator controllers associated with each generator. Current set points may be (Continued)

generated for positive/negative frames, direct quadrature frames, real/imaginary frames and may be set evenly for all generators or adjusted per generator.

20 Claims, 9 Drawing Sheets

(56) References Cited

U.S. PATENT DOCUMENTS

| | | | | |
|---|---|---|---|---|
| 7,692,321 | B2* | 4/2010 | Jones | H02J 3/381 |
| | | | | 290/43 |
| 7,755,209 | B2* | 7/2010 | Jones | H02J 3/381 |
| | | | | 290/44 |
| 9,093,924 | B2* | 7/2015 | Gupta | H02P 9/00 |
| 10,027,118 | B2* | 7/2018 | Ubben | H02J 3/18 |
| 10,063,061 | B2* | 8/2018 | Bartsch | F03D 7/047 |
| 11,239,661 | B2* | 2/2022 | Quitmann | H02J 3/50 |
| 2007/0108771 | A1* | 5/2007 | Jones | H02P 9/102 |
| | | | | 290/44 |
| 2012/0179301 | A1* | 7/2012 | Aivaliotis | H02J 3/00 |
| | | | | 700/286 |
| 2012/0323396 | A1* | 12/2012 | Shelton | H02M 7/44 |
| | | | | 700/297 |
| 2014/0142776 | A1* | 5/2014 | Nielsen | H02J 3/466 |
| | | | | 700/295 |
| 2015/0137520 | A1 | 5/2015 | Garcia | |
| 2015/0148974 | A1* | 5/2015 | Diedrichs | G05B 15/02 |
| | | | | 700/287 |
| 2015/0275862 | A1 | 10/2015 | Babazadeh et al. | |
| 2015/0381089 | A1 | 12/2015 | Tarnowski et al. | |
| 2016/0308369 | A1 | 10/2016 | Gupta et al. | |
| 2017/0009744 | A1 | 1/2017 | Brogan et al. | |
| 2017/0187189 | A1* | 6/2017 | Abido | H02J 3/46 |
| 2017/0338652 | A1* | 11/2017 | Ubben | H02J 3/1821 |
| 2021/0167601 | A1* | 6/2021 | Gupta | H02J 3/48 |
| 2021/0399549 | A1* | 12/2021 | Casal Vilana | H02J 3/466 |

OTHER PUBLICATIONS

Xu et al., "Cooperative Control of Distributed Energy Storage Systems in a Microgrid", Feb. 2014, IEEE Transactions on Smart Grid, vol. 6, No. 1, Jan. 2015. (Year: 2014).*
Rahman et al., "Agent-based reactive power management of power distribution networks with distributed energy generation", Oct. 2015, Energy Conversion and Management 120 (2016) 120-134. (Year: 2015).*
Di Silvestre et al., "A Generalized Framework for Optimal Sizing of Distributed Energy Resources in Micro-Grids Using an Indicator-Based Swarm Approach", Jan. 2012, IEEE Transactions on Industrial Informatics, vol. 10, No. 1, Feb. 2014. (Year: 2012).*
Rahman et al., "Distributed multi-agent based coordinated power management and control strategy for microgrids with distributed energy resources", Dec. 2016, Energy Conversion and Management 139 (2017) 20-32. (Year: 2016).*
Kumar et al., "A Review on Reactive Power Compensation of Distributed Energy System", 2020, IEEE 7th International Conference on Smart Structures and Systems ICSSS 2020. (Year: 2020).*
Danish Patent and Trademark Office 1st Technical Examination for Application No. PA 2018 70677 dated Feb. 14, 2019.
PCT Notification of Transmittal of the International Search Report and the Written Opinion of the International Searching Authority, or the Declaration for Application No. PCT/DK2019/050245 dated Oct. 17, 2019.

* cited by examiner

CURRENT DISPATCHING FOR POWER PLANT CONTROL

BACKGROUND

Field

The present disclosure generally relates to the control of power plants that include multiple generating units coupled to an electrical grid via shared connection point.

Description of the Related Art

Power plants that provide electrical power to a grid from a collection of several generating units are often controlled at the generating units to manage the amount of current injected into the grid. In power plants generating electricity from renewable sources, such as wind (e.g., via Wind Turbine Generators) or solar (e.g., via photovoltaics), control functions are performed at the generating unit, which allows the individual generating units to adapt to localized conditions (e.g., different wind speeds at different locations in a wind farm, different light/shade levels in a solar farm). However, control localized to the generating units may result in over or under supply of current injected into the grid, as the total current injected into the grid is the aggregate of that produced by the independently controlled individual generating units.

SUMMARY

In one embodiment, a method for controlling a power plant including a plurality of generator units that are connected to an electrical grid at a single shared connection point is provided, the method comprising: setting a reference frame for the plurality of generator units having a first axis and a second axis; measuring a grid demand voltage at the shared connection point; determining an active current required and a reactive current required at the shared connection point based on the measured grid demand voltage and one or more grid codes; transforming the active current required and the reactive current required at the shared connection point to the reference frame where the first axis defines a first current set point and onto the second axis defines a second current set point; and dispatching at least one of the first current set point and the second current set point to generator controllers associated with each generator unit of the plurality of generators units.

In various implementations, the reference frame is a direct-quadrature (dq) frame in which the first axis is formed by an active power as measured at the shared connection point and aligned with the grid demand voltage and the second axis is formed by a reactive power as measured at the shared connection point; wherein transforming the active current required and the reactive current required the shared connection point further comprises: calculating a generator unit active voltage vector and a generator unit reactive voltage vector based on the grid demand voltage, the active current required, and the reactive current required at the shared connection point; and calculating the first current set point as an active current set point and the second current set point as a reactive current set point based on the generator unit active voltage vector and the generator unit reactive voltage vector. In some implementations, the first current set point and the second current set point are set for positive sequence currents and for negative sequence currents, wherein in response to the power plant operating in an unbalanced mode, the first current set point and the second current set point are set for positive sequence dq currents and for negative sequence dq currents.

In various implementations, the reference frame is a rotating reference frame in which the first axis is a real values axis and the second axis is an imaginary values axis: synchronizing generator clocks of the generator controllers with a power plant controller clock of a power plant controller; mapping the active current required and the reactive current required at the shared connection point onto the first axis as the first current set point and onto the second axis as the second current set point based on the grid demand voltage; and rotating the rotating reference frame based on a frequency of the electrical grid to sync current produced by the plurality of generator units according to the first current set point and the second current set point with current demanded by the electrical grid at the shared connection point. In some implementations, synchronizing the generator clocks of the generator controllers further comprises one of: measuring a phase difference in electrical waves at the plurality of generator units and the shared connection point via Phasor Measurement Units (PMU) and to synchronize the generator clocks and the power plant controller clock; transmitting a time specified by the power plant controller clock as a master clock signal to synchronize the generator clocks to; and specifying an external clock that the generator clocks and the power plant controller clock are synchronized to.

In various implementations, determining the active current required and the reactive current required at the shared connection point further comprises accounting for shunt impedances between the shared connection point and the plurality of generator units.

In various implementations, the plurality of generator units includes wind turbine generators.

In various implementations, a magnitude of the first current set point and the second current set point is an averaged magnitude based on a plant level current magnitude and a number of generator units included in the plurality of generator units. In some implementations, the magnitude of the first current set point and the second current set point is adjusted at a particular generator unit of the plurality of generator units to stabilize a voltage level at the particular generator unit by raising the current set points when the voltage level is lower than a low voltage threshold and lowering the current set points when the voltage is higher than a high voltage threshold.

In another embodiment of the present disclosure a method for controlling a power plant including a plurality of generator units that are connected to an electrical grid at a single shared connection point is provided, the method comprising: measuring a demand of the electrical grid at the connection point; calculating a plant level active current set point and a plant level reactive current set point based on the demand of the electrical grid; determining an active voltage vector and a reactive voltage vector for the plurality of generator units based on the plant level active current set point and the plant level reactive current set point; determining an angle based on a Power Factor at the shared connection point; determining a collective active current set point and a collective reactive current set point for the plurality of generator units based on the angle and the plant level active current set point and the plant level reactive current set point; individualizing, based on a number of generator units included in the plurality of generator units, the collective active current set point and the collective reactive current set point; and dispatching an individualized active current set point and an individualized reactive current set point to generator controllers associated with each generator unit of the plurality of generator units.

In various implementations, wherein measuring the demand of the electrical grid at the connection point includes measuring: an active power demand; a reactive power demand; and a voltage magnitude to supply the electrical grid per at least one grid code; and wherein calculating the plant level active current set point and the plant level reactive current set point is based on the active power demand, the reactive power demand, and the voltage magnitude.

In various implementations, measuring the demand of the electrical grid at the connection point provides feed forward control of the power plant.

In various implementations, a power plant controller measures current injected into the electrical grid at the connection point to provide feedback control to the plurality of generator units.

In another embodiment, a method for controlling a power plant including a plurality of generator units that are connected to an electrical grid at a single shared connection point is provided, the method comprising: generating a rotating reference frame for complex current demanded by the electrical grid with a real axis and an imaginary axis; synchronizing clocks included in generator controllers associated with each generator unit of the plurality of generator units; measuring a demand of the electrical grid at the connection point including: an active power demand, a reactive power demand, and a voltage magnitude to supply to the electrical grid per a grid code; calculating, based on the voltage magnitude, the active power demand, and reactive power demand, a needed current at the connection point and dividing the needed current into a connection point real value and a connection point imaginary value; and dispatching the connection point real value and the connection point imaginary value to the generator controllers, such that the generator controllers are enabled to rotate the reference frame to calculate a generator side real current set point and a generator side imaginary current set point and set an associated generator unit accordingly.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

Formulae

The following formulae are referenced in the present disclosure, and are aggregated herein for convenient reference.

$$I_{d\_pcc} = P_{ref\_pcc}/U_{d\_pcc} \quad \text{[Formula 1]}$$

$$I_{d\_pcc} = P_{avd}/U_{d\_pcc} \quad \text{[Formula 2]}$$

$$I_{q\_pcc} = Q_{ref\_pcc}/U_{d\_pcc} \quad \text{[Formula 3]}$$

$$U_{d\_GU} \angle \beta = U_{d\_pcc} \angle 0 + I_{d\_pcc} \cdot R \angle 0 + I_{d\_pcc} \cdot X \angle 90 + I_{q\_pcc} \cdot R \angle 90 + I_{q\_pcc} \cdot X \angle 0 \quad \text{[Formula 4]}$$

$$\alpha = \tan^{-1}(PF_{pcc}) - \beta \quad \text{[Formula 5]}$$

$$\alpha = \beta - \tan^{-1}(PF_{pcc}) \quad \text{[Formula 6]}$$

$$I_{q\_GU} = I_{pcc} \cdot \sin(\alpha) \quad \text{[Formula 7]}$$

$$I_{d\_GU} = I_{pcc} \cdot \cos(\alpha) \quad \text{[Formula 8]}$$

$$V_{1PCC} = (V_{aPCC} + \alpha V_{bPCC} + \alpha^2 V_{cPCC})/3 \quad \text{[Formula 9]}$$

$$V_{2PCC} = (V_{aPCC} + \alpha^2 V_{bPCC} + \alpha V_{cPCC})/3 \quad \text{[Formula 10]}$$

$$V_{0PCC} = (V_{aPCC} + V_{bPCC} + V_{cPCC})/3 \quad \text{[Formula 11]}$$

$$\alpha = e^{j2\pi/3} = 1 \angle 120° \quad \text{[Formula 12]}$$

DETAILED DESCRIPTION

The present disclosure provides strategies for current dispatching for power plant control, which may be embodied in systems, methods, and computer program products. The discussed current dispatching strategies centralize control of current set points within a power plant to a power plant controller (also referred to as a PPC) from the various generating units within the power plant. The power plant controller is able to measure the voltage and current flow, and to calculate, estimate or measure the plant impedance matrix at a connection point to an electrical grid relative to the power requirements requested by the electrical grid to adjust how the individual generators are set to produce power. As will be appreciated, elements of this strategy improve the performance capabilities of power plants in complying with grid power requirements and the speed at which the power plant as a whole reacts to changes in the grid relative to strategies in which the individual generators have current set points individually set based on reading taken at the generator. Additional benefits will be apparent upon reading the present disclosure.

Figure 1:
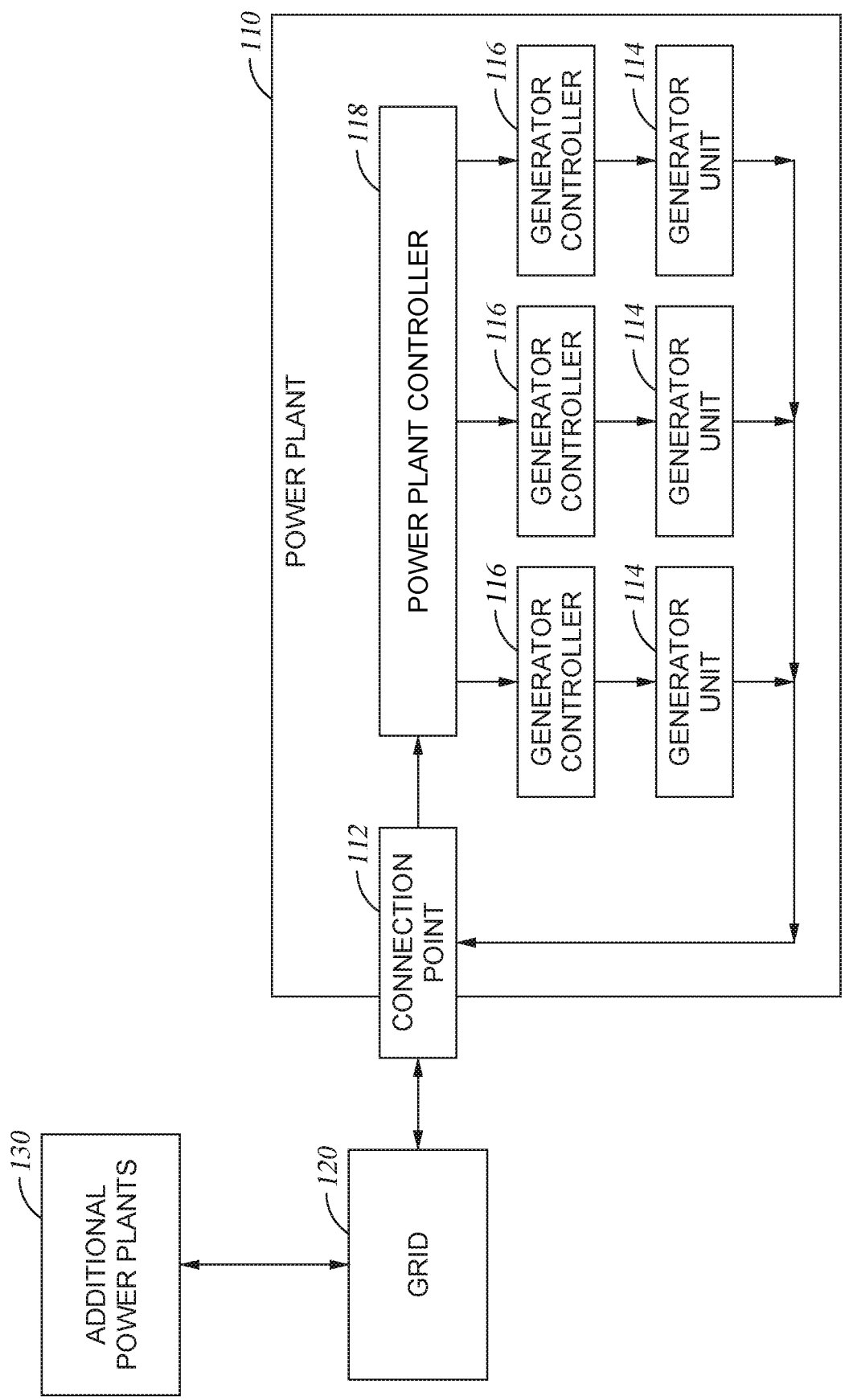
FIG. 1 illustrates a diagrammatic view of a power plant supplying electrical power to an electrical grid, according to embodiments of the present disclosure.

FIG. 1 illustrates a diagrammatic view of a power plant 110 supplying electrical power to an electrical grid 120. As will be appreciated, the electrical grid 120 may be supplied electrical power from one or more additional power plants 130, which may be similar to or different from the example power plant 110 described herein. Various devices may connect to or be integrated into the electrical grid 120 to draw power, condition power, or protect/isolate other devices, which are not illustrated herein so as to not distract from the novelty of the present disclosure.

The power plant 110 is connected to the electrical grid 120 via a connection point 112 at which the power from several generator units 114 is aggregated for injection into the electrical grid 120. The connection point 112 may also be referenced as a Point of Common Coupling (PCC).

Some non-limiting examples of the plurality of generator units 114 include wind turbine generators (WTGs), photovoltaic cells (PVCs), fueled generators (FGs) using a combustible fuel (e.g., biomass). In some embodiments, the plurality of generator units 114 are of a same type and/or a same power generation capacity. In other embodiments, one or more of the plurality of generator units 114 are of a different type and/or a different power generation capacity. For example, a first power plant 110 of a wind farm may include only WTGs as generator units 114, but of two or more different types of WTG, while a second power plant 110 of a solar farm may include several PVCs and one FG (e.g., for station keeping purposes in the event when sufficient sunlight is not available) as generator units 114. The plurality of generator units 114 may have any suitable arrangement, e.g., in parallel and/or in series with each other. The number of the plurality of generator units 114 in the power plant 110 may vary in different embodiments. The values of measurements (e.g., voltage output, current output) from individual generator units 114 are generally measured locally at each generator unit 114, and may be indicated in formulas given herein via the subscript "GU". In one embodiment, the measurements are taken at a low voltage side of the generator unit 114. In another embodiment, the measurements are taken at a medium voltage side of the generator unit 114. The location relative to the voltage side of the generator unit 114 at which the measurements are taken affects the values of measurements of the aggregated plant impedance and the sensors used to gather those measurements, but not the overall operation of the present disclosure.

Each generator unit 114 is coupled with a generator controller 116 that controls operations of the generator unit 114. In some embodiments, the generator controller 116 includes several sub-units responsible for managing individual features of the generator unit 114, such as, for example, a power level controller, a current controller, a physical controller (affecting blade pitch, nacelle/PVC angle in the environment, fuel pumps, coolant flow, deicing systems activation, etc.). In the present strategy, the generator controller 116 receives a current set point and a reference frame for balancing active/reactive power, which are fed forward from the power plant controller 118 based on present conditions in the electrical grid 120. The generator controller 116 continues to control the associated generator unit 114 using the supplied current set point (e.g., angling the generator unit 114 into/out of the wind/sun, adjusting turbine torque).

A power plant controller 118 is coupled with the connection point 112 to measure conditions of the current injected by the plurality of generator units 114 into the electrical grid 120, including the reactive/active power balance, the impedance of the power plant 110, the power requirements for the electrical grid 120 during various operational states. Some non-limiting examples of operational states of the power plant 110 include normal operation, an Over Voltage Ride Through (OVRT) event, Under Voltage Ride Through (UVRT) event according, islanded operations (in which the portion of the electrical grid 120 to which the power plant 110 is connected is isolated from other portions of the electrical grid 120 and/or additional power plants 130), or blackstart operations (in which the power plant 110 bootstraps power generation from shutdown conditions) according to various grid codes and procedures.

The power plant controller 118 is in communication with each of the generator controllers 116, and provides current set points to the generator controllers 116 based on observed measurements of the power requirements for the electrical grid 120 at the connection point 112 (according to relevant grid codes for the region in which the electrical grid 120 is located), the number of generator units 114 in the power plant 110, the impedance of the power plant 110, the voltage at the connection point 112, and the current flow at the connection point 112. The power plant controller 118 provides a reference frame and active and/or reactive current set points to each of the generator controllers 116 to set the currents that each of the generator units 114 output based on centralized measurements of the power plant's performance relative to grid requirements. This allows the power plant 110 to perform control of localized production and physical characteristics (e.g., blade angle, turbine torque, incidence to wind/sun) at the individual generator controllers 116, and move performance of the calculation for current requirements away from the generator units 114 to the power plant controller 118 at the connection point 112 to the electrical grid 120. In this way, the total current injected into the grid 120 is based on the profile of the power plant controller 118 rather than several profiles for individual generator controllers 116, which enables the power plant 110 to more accurately and more responsively meet the grid requirements while still accounting for localized conditions (e.g., differing weather conditions) at the generator units 114.

In one example, the power plant controller 118 uses a direct quadrature (dq) frame as a reference frame when setting the set points for the currents that the generator units 114 are to use. In this example, the power plant controller 118 calculates an angle difference between the plant level current at the connection point 112 and the local generator unit levels (e.g., low voltage or medium voltage levels) of the individual generator units 114, which is then applied to a d-frame and/or q-frame current set point transmitted to the generators controllers 116. The individual set points are made for positive or negative sequence d-frames and q-frames in various embodiments. One method according to this example is discussed in greater detail in regard to FIG. 4.

In another example, the power plant controller 118 establishes a rotating reference frame that is shared between the power plant controller 118 and the generator units 114 when setting the set points for the currents that the generator units 114 are to use. The power plant controller 118 synchronizes clocks with the individual generator controllers 116 so that the angle specified in the set point is based on the angle at the connection point 112, and the individual generator controllers 116 translate the original angle to a local angle based on the timed rotation of the reference frame. In the present example, the reference frame rotates according to the nominal frequency of the electrical grid 120 (e.g., 50 Hz or 60 Hz) so that the generator controllers 116 is enabled to determine the local angle to produce current to be received at the specified angle at the connection point 112. One method according to this example is discussed in greater detail in regard to FIG. 5.

In one example, the power plant controller 118 sets the magnitude for the individual current set points based on the number of generator units 114 as an average value. Stated differently, in a power plant 110 including n generator units 114, the power plant controller determines the magnitude of $I_d$ and $I_q$ at the plant level, and sets the generator level magnitudes to be $I_d/n$ and $I_q/n$ for each of the generator units 114.

In another example, the power plant controller 118 sets the magnitude for the individual current set points based on the local measurements for each generator unit 114. Stated differently, based on the voltage readings supplied from each generator unit 114, the power plant controller 118 raises or lowers the current set point for individual generator units 114 to stabilize the generator unit voltage levels while also avoiding over-voltage or under-voltage trip protection in the generator units 114. For example, a first generator unit 114 reporting a higher output voltage receives a lower current set point than a second generator unit 114 reporting a lower output voltage.

Figure 2A:
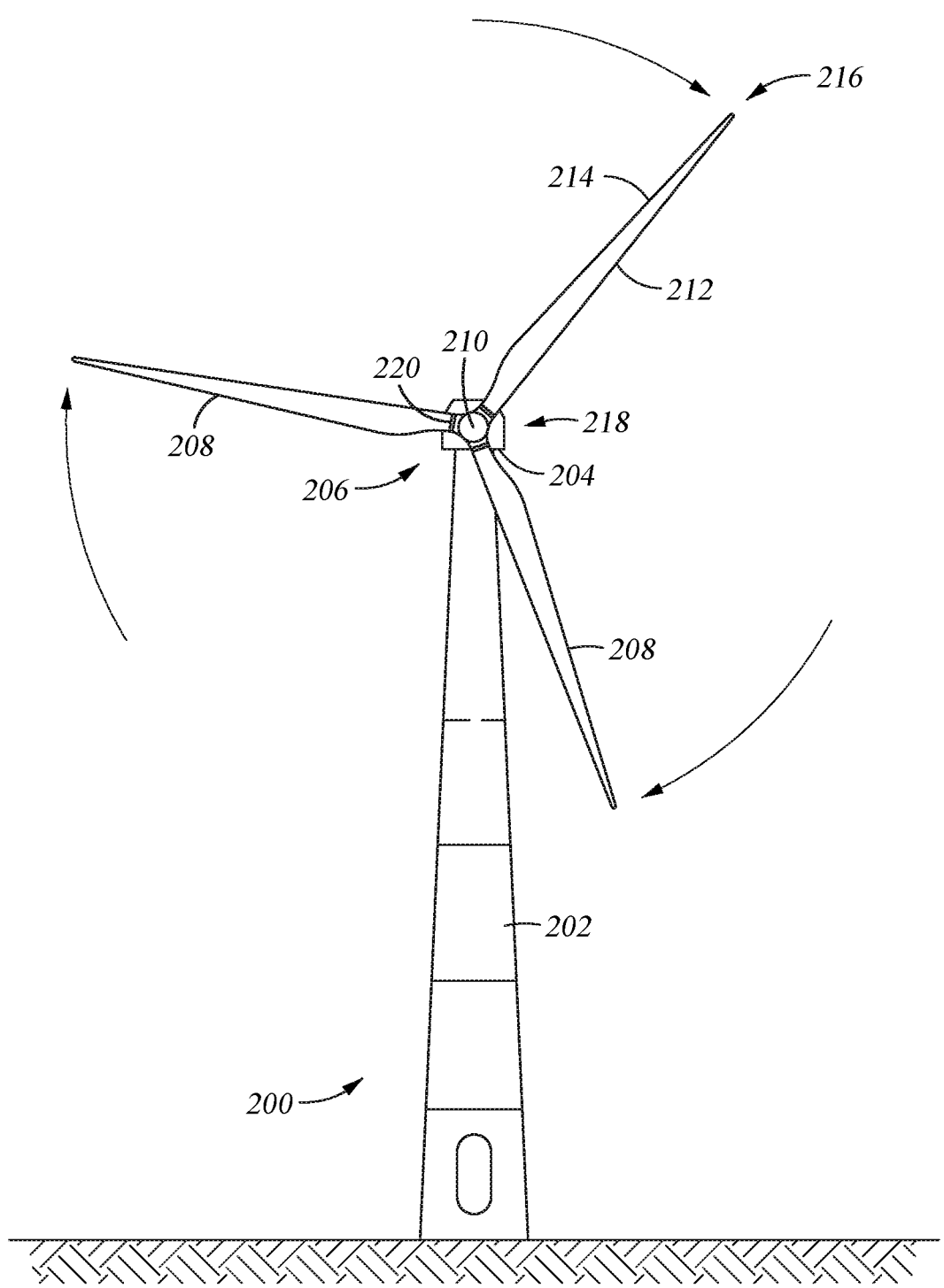
FIG. 2A illustrates a diagrammatic view of an exemplary wind turbine, according to one or more embodiments.
Figure 2B:
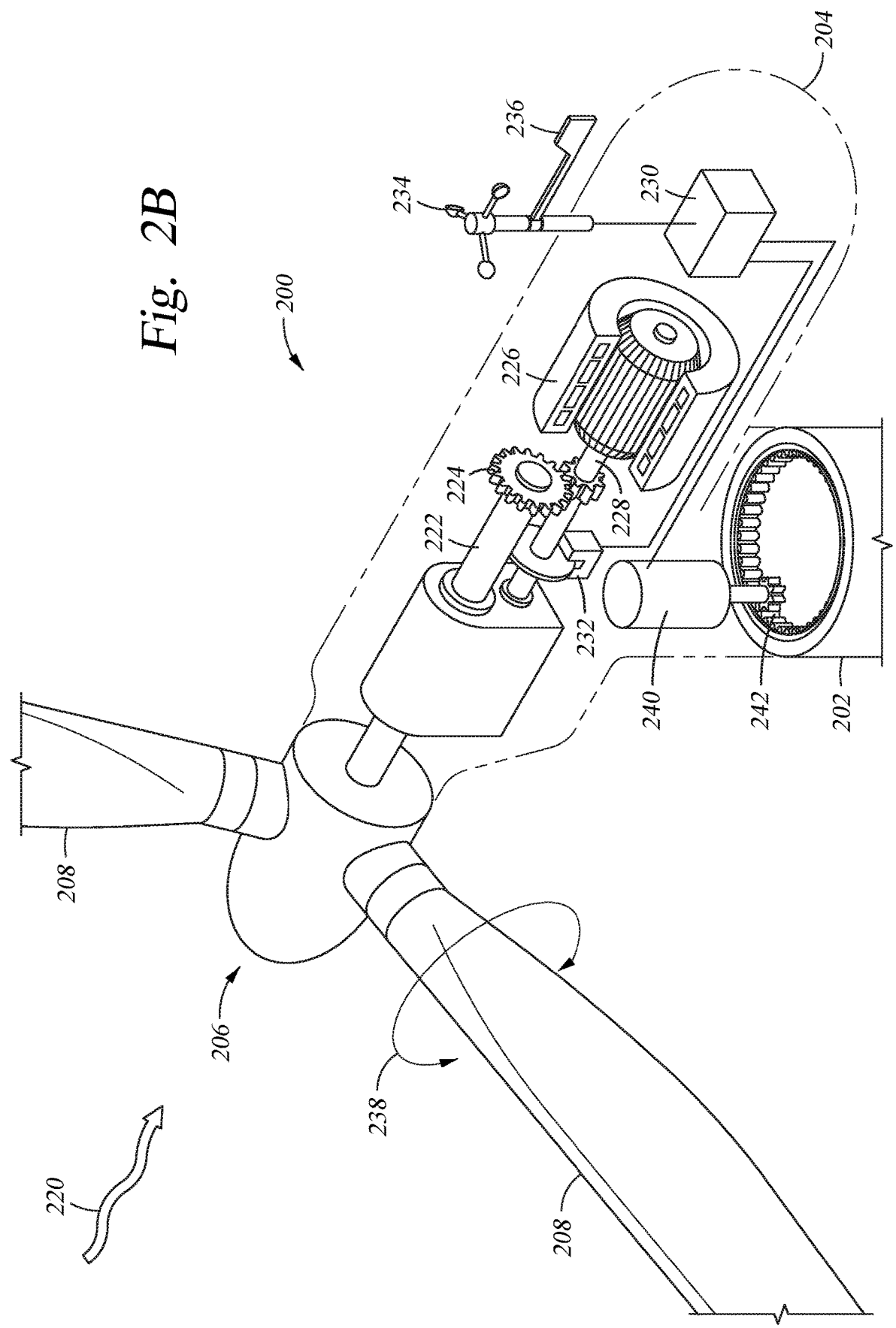
FIG. 2B illustrates a diagrammatic view of typical components internal to a wind turbine, according to embodiments of the present disclosure.

FIG. 2A illustrates a diagrammatic view of an exemplary wind turbine 200 and FIG. 2B illustrates a diagrammatic view of typical components internal to a wind turbine 200, as an example of a generator unit 114.

Although the wind turbine 200 is illustrated as a horizontal-axis wind turbine, the principles and techniques described herein may be applied to other wind turbine implementations, such as vertical-axis wind turbines. The wind turbine 200 typically comprises a tower 202 and a nacelle 204 located at the top of the tower 202. A rotor 206 is connected with the nacelle 204 through a low-speed shaft 222 extending out of the nacelle 204.

As shown, the rotor 206 comprises multiple rotor blades 208 mounted on a common hub 210 which rotate in a rotor plane, and the rotor 206 may comprise any suitable number of blades, such as one, two, three, four, five, or more blades. The blades 208 (or airfoil(s)) typically each have an aerodynamic shape with a leading edge 212 for facing into the wind, a trailing edge 214 at the opposite end of a chord for the blades 208, a tip 216, and a root 218 for attaching to the hub 210 in any suitable manner. For some embodiments, the blades 208 may be connected to the hub 210 using pitch bearings 220, such that each blade 208 may be rotated around a longitudinal axis to adjust the blade's pitch. The pitch angle of a blade 208 relative to the rotor plane may be controlled by linear actuators, hydraulic actuators, or stepper motors, for example, connected between the hub 210 and the blades 208.

When the wind 220 is incident on the blades 208, the rotor 206 rotates and transfers momentum to rotate a low-speed shaft 222. Gears in a gearbox 224 mechanically convert the low rotational speed of the low-speed shaft 222 into a relatively high rotational speed of a high-speed shaft 228 suitable for generating electricity using a generator 226.

A turbine controller 230 may sense the rotational speed of one or both of the low-speed shaft 222 and the high-speed shaft 228. If the turbine controller 230 determines that the shaft(s) are rotating too fast, the turbine controller 230 may pitch the blades 208 out of the wind 220 or by increasing the torque from the generator 226 which slows the rotation of the rotor 206 i.e., reduces the revolutions per minute (RPM). A braking system 232 may prevent damage to the components of the wind turbine 200 by keeping the hub 210 from rotating when the hub 210 is already at, or very close, to standstill. The controller 230 may also receive inputs from an anemometer 234 (providing wind speed) and/or a wind vane 236 (providing wind direction). Based on information received, the controller 230 may send a control signal to one or more of the blades 208 to adjust the pitch 238 of the blades 208. By adjusting the pitch 238 of the blades 208, the rotational speed of the rotor 206 (and therefore, the shafts 222, 228) may be increased or decreased. Based on the wind direction, for example, the controller 230 may send a control signal to an assembly comprising a yaw motor 240 and a yaw drive 242 to rotate the nacelle 204 with respect to the tower 202, such that the rotor 206 may be positioned to face more (or, in certain circumstances, less) upwind.

Figure 3:
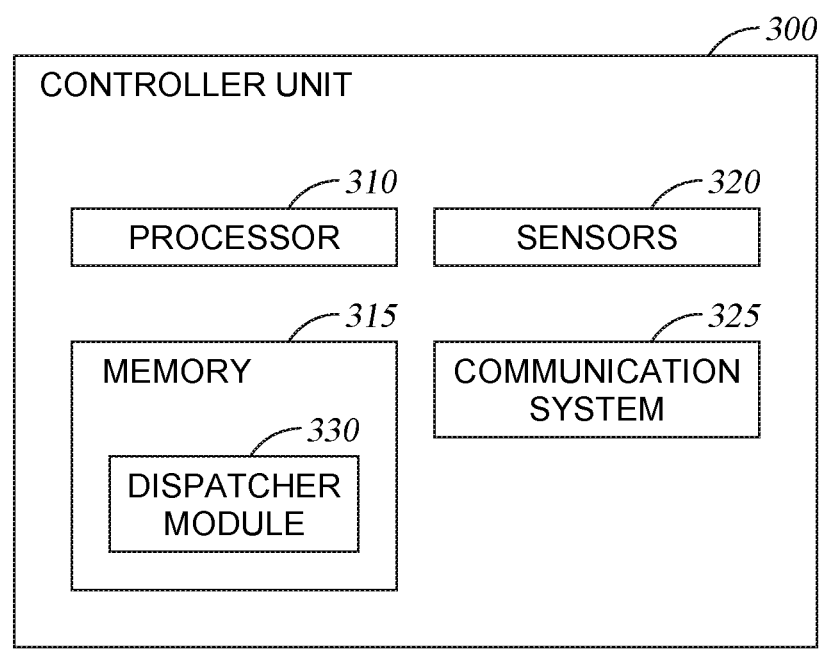
FIG. 3 is a block diagram of a controller unit as may be used as a generator controller or a power plant controller, according to one or more embodiments

FIG. 3 is a block diagram of a controller unit 300 that may be used as a generator controller 116 for an example generator unit 114, or as a power plant controller 118 for a power plant 110, according to one or more embodiments. The controller unit 300 includes one or more computer processors 310 and a memory 315. The one or more computer processors 310 represent any number of processing elements that each can include any number of processing cores. The memory 315 can include volatile memory elements (such as random access memory), non-volatile memory elements (such as solid-state, magnetic, optical, or Flash-based storage), and combinations thereof. Moreover, the memory 315 can be distributed across different mediums (e.g., network storage or external hard drives).

As shown, the one or more computer processors 310 are communicatively coupled with one or more sensors 320, which include one or more of a voltage sensor, a current sensor, an impedance sensor, a mechanical sensor, a wind sensor, a light sensor, a fuel gauge, an ambient temperature sensor, etc. The one or more computer processors 310 are further coupled with a communication system 325 to send/receive communications via fiber optic cables, electrical wires, and/or radio signals with other controller units 300 or external devices (e.g., maintenance technician computing devices).

The computer processors 310 and the communication system 325 may together or separately provide a clock in the controller unit 300. For example, cycles of the computer processors 310 may be counted to maintain a clock, or the communication system 325 may receive a signal from an external clock for timekeeping purposes. Examples external clocks include Global Positioning System (GPS) timekeeping signals, time signals from a master computer device, or the like, which may be used as the clock or to update or adjust a locally maintained clock.

The memory 315 includes one or a plurality of "modules" for performing various functions described herein. In one embodiment, each module includes program code that is executable by one or more of the computer processors 310. However, other embodiments include modules that are partially or fully implemented in hardware (i.e., circuitry) or firmware.

The memory 315 includes a dispatcher module 330 that enables the power plant controller 118 to set a reference current level for a given frame for the generator controllers 116 within the power plant 110 and transmit that reference current to the generator controllers 116. The dispatcher module 330 enables the generator controllers 116 receive the reference current level from the power plant controller 118 and to control the respective generator units 114 to implement the reference current level.

Figure 4:
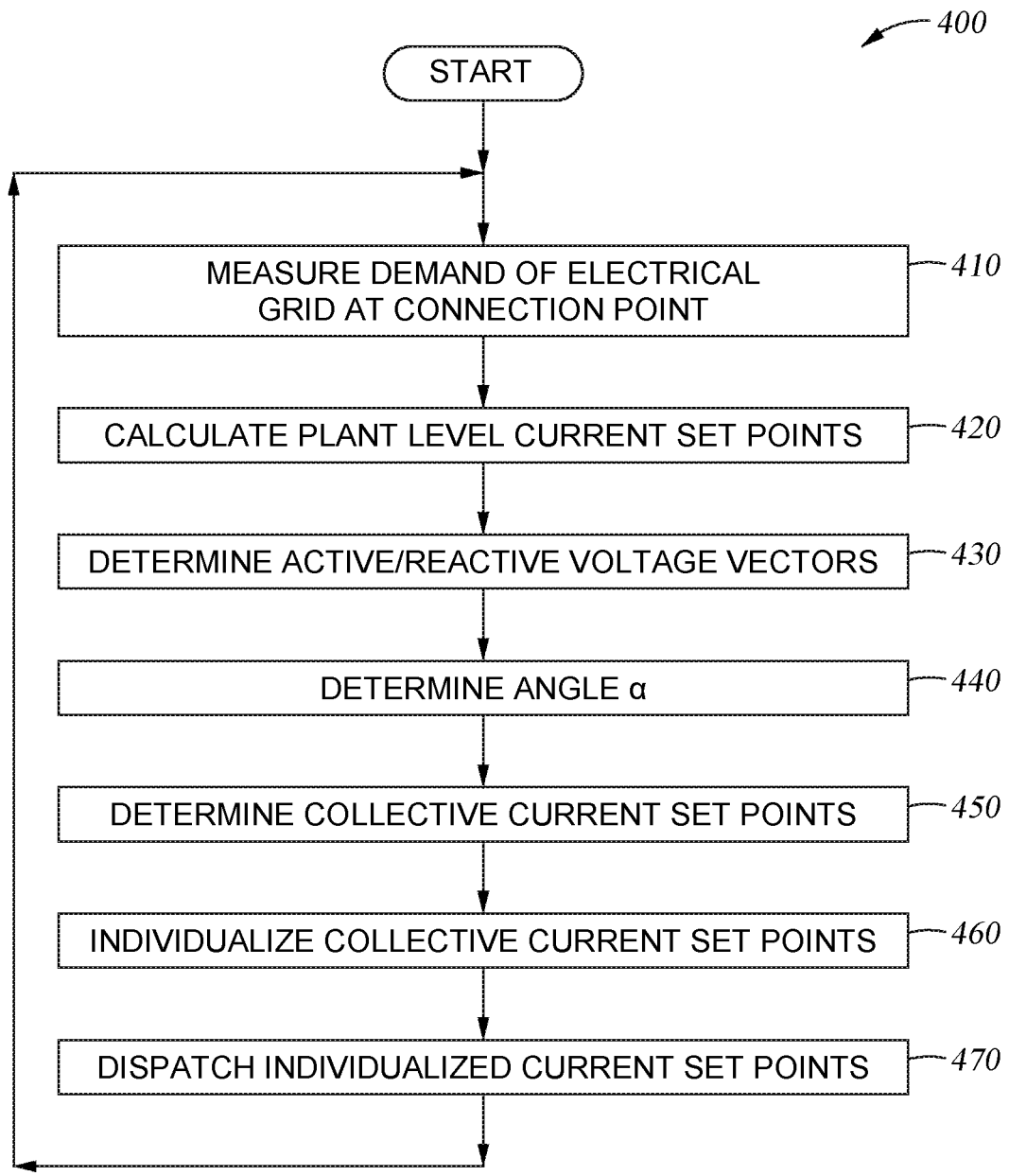
FIG. 4 is a flowchart of a method for current dispatching for power plant control according to embodiments of the present disclosure using a reference frame of a direct quadrature frame.

FIG. 4 is a flowchart of a method 400 for current dispatching for power plant control according to embodiments of the present disclosure using a reference frame of a dq frame. Method 400 may be performed fully by the power plant controller 118 or partially by the power plant controller 118 and by the generator controllers 116 if provided the requisite inputs by the power plant controller 118.

Method 400 begins at block 410, where the power plant controller 118 measures the present demands of the electrical grid 120 at the connection point 112. Values measured include the active power demand ($P_{ref\_pcc}$), the reactive power demand ($Q_{ref\_pcc}$), and the measured voltage magnitude ($U_{d\_pcc}$) to supply the electrical grid 110 per the relevant grid code. These values measured at the connection point 112 form the axes of a dq reference frame with active power measurements forming one axis and the reactive power measurements forming the other axis.

To calculate the individual voltage angles at the individual generator units 114, the impedances in the collection grid must be known. Based on the impedances of the individual components in the grid, such as, for example, step up transformers, collector cables, etc., a total impedance matrix of the power plant 110 can be derived. Based on this impedance and measurements such as active and reactive power at the generation units 114, voltage magnitude at connection points of the generation units 114 and the voltage magnitude at the connection point 112, a state estimator can estimate the individual grid angles of the individual generation units 114. Alternatively, an aggregated plant impedance, Z, can be calculated under the assumption that all the generator units 114 provide the same power infeed.

The power plant controller 118 may also measure the impedance (Z) of the power plant 110 or be supplied some parameters to use for calculating the aggregated impedance of the power plant 110. This aggregated plant impedance determines the relationship between the plant level current vector and the generator unit level current vectors. The impedance includes real (R) and imaginary (X) components due to the resistive, capacitive, and inductive impedances within the power plant 110. Various shunt impedance sources/values may affect the reference frames and set points discussed herein, which are not included in the example formulas given herein so as to not distract from the novelty of the present disclosure. The power plant controller 118 is therefore enabled to adjust method 400 to account for transformer magnetization, cable capacitance, capacitor/reactor banks, Static Synchronous Compensator (STATCOM) shunt devices, and other substation devices and sources of shunt impedance.

At block 420, the power plant controller 118 calculates the active current set point ($I_{d\_pcc}$) and the reactive current set point ($I_{q\_pcc}$) at the plant level using the measurements made in block 410. The power plant controller 118 may calculate the plant-level active current set point based on Formula 1 if the measured active power is less than the active power available ($P_{ava}$) or Formula 2 if the measured active power is greater than the active power available. The power plant controller 118 calculates the reactive current set point according to Formula 3. In various embodiments, the power plant controller 118 also calculates individual set points for positive and negative sequence dq currents.

$$I_{d\_pcc}=P_{ref\_pcc}/U_{d\_pcc} \qquad \text{[Formula 1]}$$

$$I_{d\_pcc}=P_{ava}/U_{d\_pcc} \qquad \text{[Formula 2]}$$

$$I_{q\_pcc}=Q_{ref\_pcc}/U_{d\_pcc} \qquad \text{[Formula 3]}$$

At block 430, the power plant controller 118 determines active (d-frame) and reactive (q-frame) vectors for the local voltages at the generator units 114 ($U_{d\_GU}$ and $U_{q\_GU}$), which are both offset by an angle β (beta) from the respective active and reactive axes in the dq reference frame. The power plant controller 118 calculates the active voltage ($U_{d\_GU}$) at angle β according to Formula 4 to yield the angle β for further analysis.

$$U_{d\_GU}\angle\beta=U_{d\_pcc}\angle 0+I_{d\_pcc}\cdot R\angle 0+I_{d\_pcc}\cdot X\angle 90+ \\ I_{q\_pcc}\cdot R\angle 90+I_{q\_pcc}\cdot X\angle 0 \qquad \text{[Formula 4]}$$

At block 440, the power plant controller 118 determines an angle α (alpha) in the dq reference frame based on the Power Factor ($PF_{pcc}$) at the connection point 112. Assuming no current losses between the generator units 114 and the connection point 112, the apparent current at the connection point ($I_{pcc}$) is the same as the total current output from the generator units 114 ($I_{GU}$), which form the hypotenuse of the right triangle formed by the active and reactive currents at the connection point 122 ($I_{d\_pcc}$ and $I_{q\_pcc}$). Therefore, the power plant controller 118 calculates angle α according to Formula 5 when reactive current at the generator units 114 ($I_{q\_GU}$) is positive, and according to Formula 6 when reactive current at the generator units 114 ($I_{q\_GU}$) is negative.

$$\alpha=\tan^{-1}(PF_{pcc})-\beta \qquad \text{[Formula 5]}$$

$$\alpha=\beta-\tan^{-1}(PF_{pcc}) \qquad \text{[Formula 6]}$$

Figure 5A:
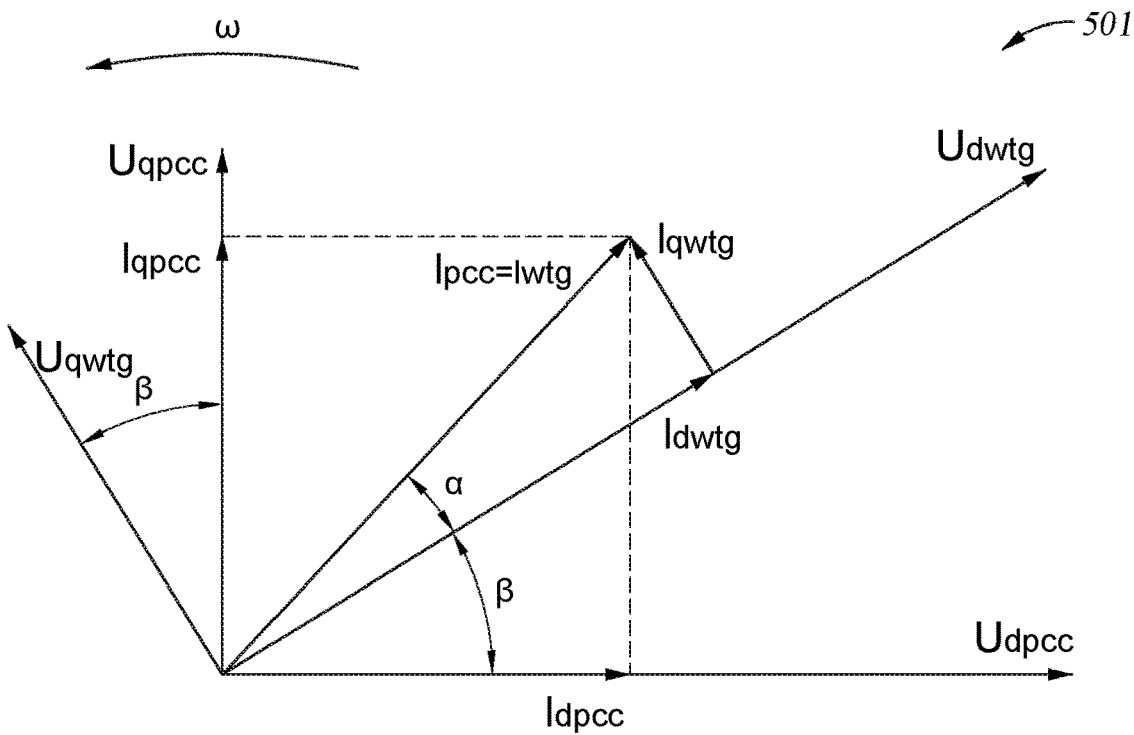
FIGS. 5A and 5B provide visualizations for calculations discussed in reference to FIG. 4, according to embodiments of the present disclosure.
Figure 5B:
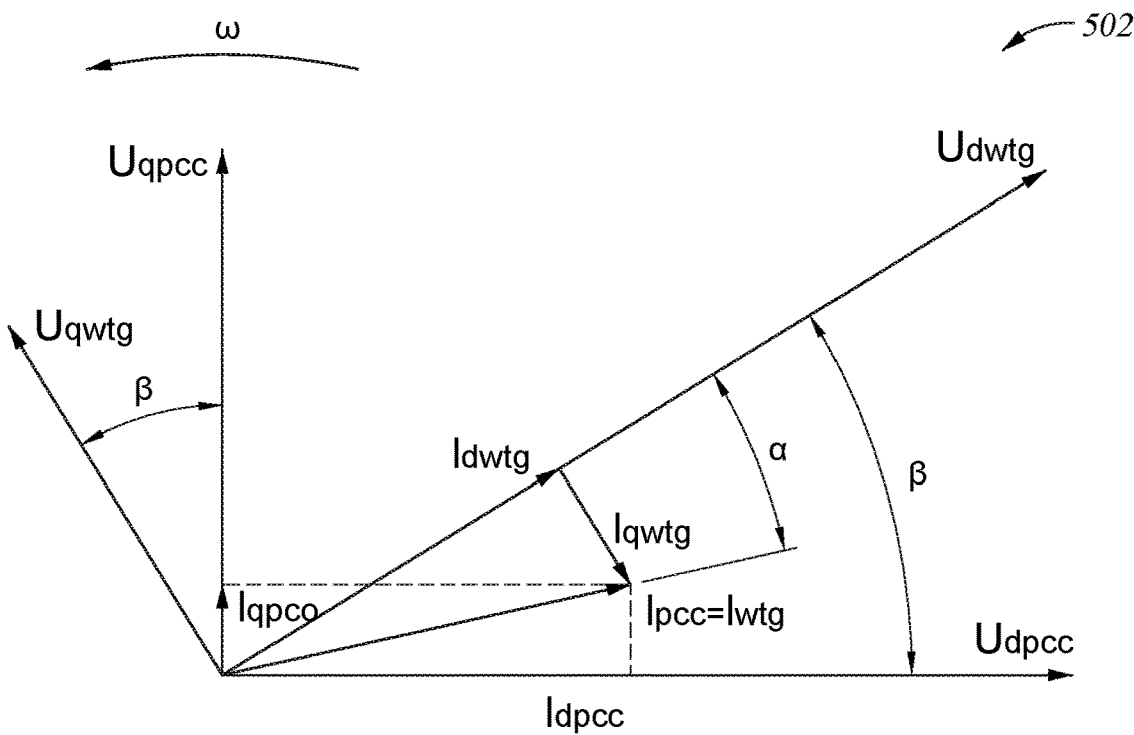

Blocks 430 and 440 may be understood in association with the visualizations provided in FIGS. 5A and 5B. FIG. 5A illustrates a set point angle calculation visualization 501 for a positive $I_{q\_wtg}$ at the generator unit 114, and FIG. 5B illustrates a voltage angle calculation visualization 702 for a negative $I_{q\_wtg}$ at the generator unit 114.

At block 450, the power plant controller 118 determines the current set points for active and reactive current for the collective generator units 114 ($I_{d\_GU}$ and $I_{q\_GU}$) in the power plant 110. The power plant controller 118 determines the reactive current set point according to Formula 7. The power plant controller 118 may calculate the current set point based on Formula 8 if the active power demand ($P_{ref\_pcc}$) is less than the power available ($P_{ava}$), but otherwise will set the active current set point to the maximum value given the presently available power.

$$I_{q\_GU}=I_{pcc}\cdot\sin(\alpha) \qquad \text{[Formula 7]}$$

$$I_{d\_GU}=I_{pcc}\cdot\cos(\alpha) \qquad \text{[Formula 8]}$$

At block 460, the power plant controller 118 individualizes the collective current set points based on the number of generator units 114 in the power plant 110 and/or the voltage characteristics of each generator unit 114 as measured locally to an individual generator unit 114. In one example, the power plant controller 118 in a power plant 110 of n generator units 114 uses average d-frame and q-frame current set points for all of the generator units 114 in the power plant 110 such that each generator unit 114 receives the same set point values (i.e., $I_{d\_GU1}=I_{d\_GU2}=I_{d\_GU3}=\ldots=I_{d\_GU_n}=(I_{d\_GU}\div n)$ and $I_{q\_GU1}=I_{q\_GU2}=I_{q\_GU3}=\ldots=I_{q\_GU_n}=(I_{q\_GU}\div n)$). In another example, the power plant controller 118 monitors the voltage of each generator unit 114 and further adjusts the current set point for the particular generator unit 114 to stabilize the voltage level by raising the current set points when the voltage is lower than expected and lowering the current set points when the voltage is higher than expected (e.g., relative to other generator units 114 or low/high voltage thresholds).

At block 470, the power plant controller 118 dispatches the individualized current set points to the generator controllers 116 for the generator units 114. In various embodiments, the current set points are dispatched over different transmission media including fiber optic cables, radio waves, electrical wires and the like depending on the hardware capabilities of the communication systems used in the power plant 110. In some instances, the current set points that are dispatched bypass a power controller included in the generator controllers 116 and are dispatched directly to a current controller.

Method 400 returns to block 410 from block 470 to repeat so that the power plant controller 118 continues to set and adjust current set points as the conditions in the electrical grid 120 and/or in the power plant 110 change over time. In this way, the power plant controller 118 provides feed forward control of the generator units 114 based on power conditions in the electrical grid 110, and receives feedback from the injectable current collected from the several generator units 114.

Figure 6:
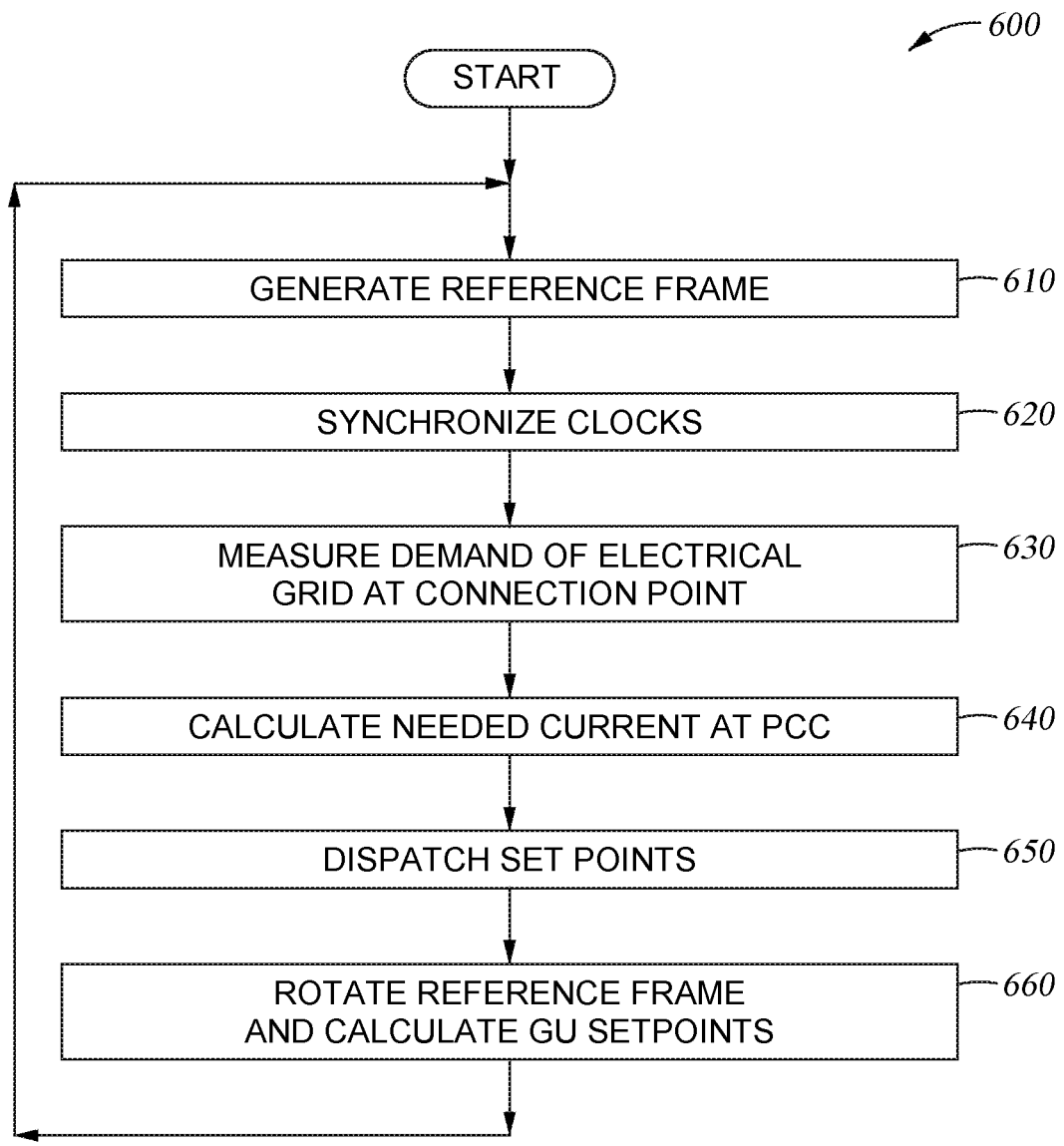
FIG. 6 is a flowchart of a method for current dispatching for power plant control according to embodiments of the present disclosure using a reference frame of a rotating frame.

FIG. 6 is a flowchart of a method 600 for current dispatching for power plant control according to embodiments of the present disclosure using a reference frame of a rotating frame. Method 600 is performed partially by the power plant controller 118 and by the generator controllers 116, but may be understood to be fully performed by the generator controllers 116 in response to receiving inputs from the power plant controller 118.

Method 600 begins at block 610, where the power plant controller 118 generates a rotating reference frame for the complex current demanded by the electrical grid 120 having a real axis and an imaginary axis. The generated reference frame is transmitted to (and received by) each generator controller 116 in the power plant to refer to when the power plant controller 118 specifies a current set point. Each controller 116/118 maintains the reference frame with a rotation based on the frequency of the power grid (e.g., 50 Hz or 60 Hz) so that real/imaginary values specified in the reference frame at time 1 are rotated at the grid-specified rate and re-translated to real/imaginary set points for the individual generator units 114 in the power plant 110 at time 2 to meet the needs of the power plant 110 for injection into the electrical grid 120 at time 3.

At block 620, the plant controller 118 synchronizes an internal clock with the internal clocks of the generator controllers 116 so that every controller 118/116 in the power plant has the same time. In one example, the plant controller 118 specifies one clock (e.g., the clock of the plant controller 118) as a master clock to which all the clocks of the generator controller 116 use to set the time. In another example, the power plant controller 118 specifies an external clock signal as a master clock to which all controllers 116/118 in the power plant 110 use to set the time. In another embodiment, Phasor Measurement Units (PMU) at each of the controllers 116/118 are employed to use GPS synchronized clocks as a common time source for synchronization.

At block 630, the power plant controller 118 measures the present demands of the electrical grid 120 at the connection point 112. Values measured include the active power demand ($P_{ref\_pcc}$), the reactive power demand ($Q_{ref\_pcc}$), and the measured voltage magnitude ($U_{d\_pcc}$) to supply the electrical grid 110 per the relevant grid code. In various embodiments, the power plant controller 118 also measures or estimates the impedance (Z) of the power plant 110 or be supplied some parameters to use for calculating the aggregated impedance of the power plant 110. The impedance includes real (R) and imaginary (X) components due to the resistive, capacitive, and inductive impedances within the power plant 110. Various shunt impedance sources/values may affect the reference frames and set points discussed herein, which are not included in the example formulas given herein so as to not distract from the novelty of the present disclosure. The power plant controller 118 is therefore enabled to adjust method 600 to account for transformer magnetization, cable capacitance, capacitor/reactor banks, Static Synchronous Compensator (STATCOM) shunt devices, and other substation devices and sources of shunt impedance.

At block 640, the power plant controller 118, based on the measured voltage at connection point 112, the active power set point, and reactive power set point, calculates the needed current ($I_{pcc}$) at the connection point 112. The power plant controller 118 then divides the needed current into a real current set point ($I_{real\_pcc}$) and an imaginary current set point ($I_{imaginary\_pcc}$) via the reference frame generated in block 610. This can be done by defining active and a reactive current required at the connection point 112 and then transforming those into the reference frame generated in block 610 hereby generating the real current set point ($I_{real\_pcc}$) and the imaginary current set point ($I_{imaginary\_pcc}$) defined as the first axis and the second axis, respectively, in the reference frame. In some embodiments, the power plant controller 118 attaches a timestamp for when the needed current was requested, while in other embodiments, a transmission delay from the power plant controller 118 to the generator controllers 116 is known.

At block 650, the plant controller 118 dispatches the calculated real and imaginary current set points ($I_{real\_pcc}$ and $I_{imaginary\_pcc}$) as current demand to the generator controllers 116. In various embodiments, the current set points are dispatched over different transmission media including fiber optic cables, radio waves, electrical wires and the like depending on the hardware capabilities of the communication systems used in the power plant 110. In some instances, the current set points that are dispatched bypass a power controller included in the generator controllers 116 and are dispatched directly to a current controller.

At block 660, the generator controllers 116, based on an individual local terminal voltage (UGu), the received current references ($I_{real\_pcc}$ and $I_{imaginary\_pcc}$), and the plant reference frame, each calculate the generator side real current set point ($I_{real\_GU}$) and generator side imaginary current set point ($I_{imaginary\_GU}$) that the associated generator units 114 need to deliver to the connection point 112.

A generator controller 116 rotates the plant reference frame at an angular velocity (ω) that is based on the frequency of power supplied to the electrical grid 110 (e.g., 18000 degrees per second at 50 Hz or 21600 degree per second at 60 Hz) in sync with the clocks within the power plant 110. How far the generator controller 116 rotates the frame depends on the time difference from when the current references were received by the generator controller 116 and when current generated by the associated generator unit 114 is injected via the connection point 112 into the electrical grid 110. For example, a time difference of 1 second results in several complete rotations, and an offset angle of 0 degrees, but a time difference of 0.00167 seconds results in an offset angle of approximately 30 degrees at 50 Hz or 36 degrees at 60 Hz.

Once rotated, the generator controller 116 re-determines the real and imaginary components specified by the set points as-rotated. The real values are combined to determine the generator level real current to supply and the imaginary values are combined to determine the generator level imaginary current to supply.

Figure 7:
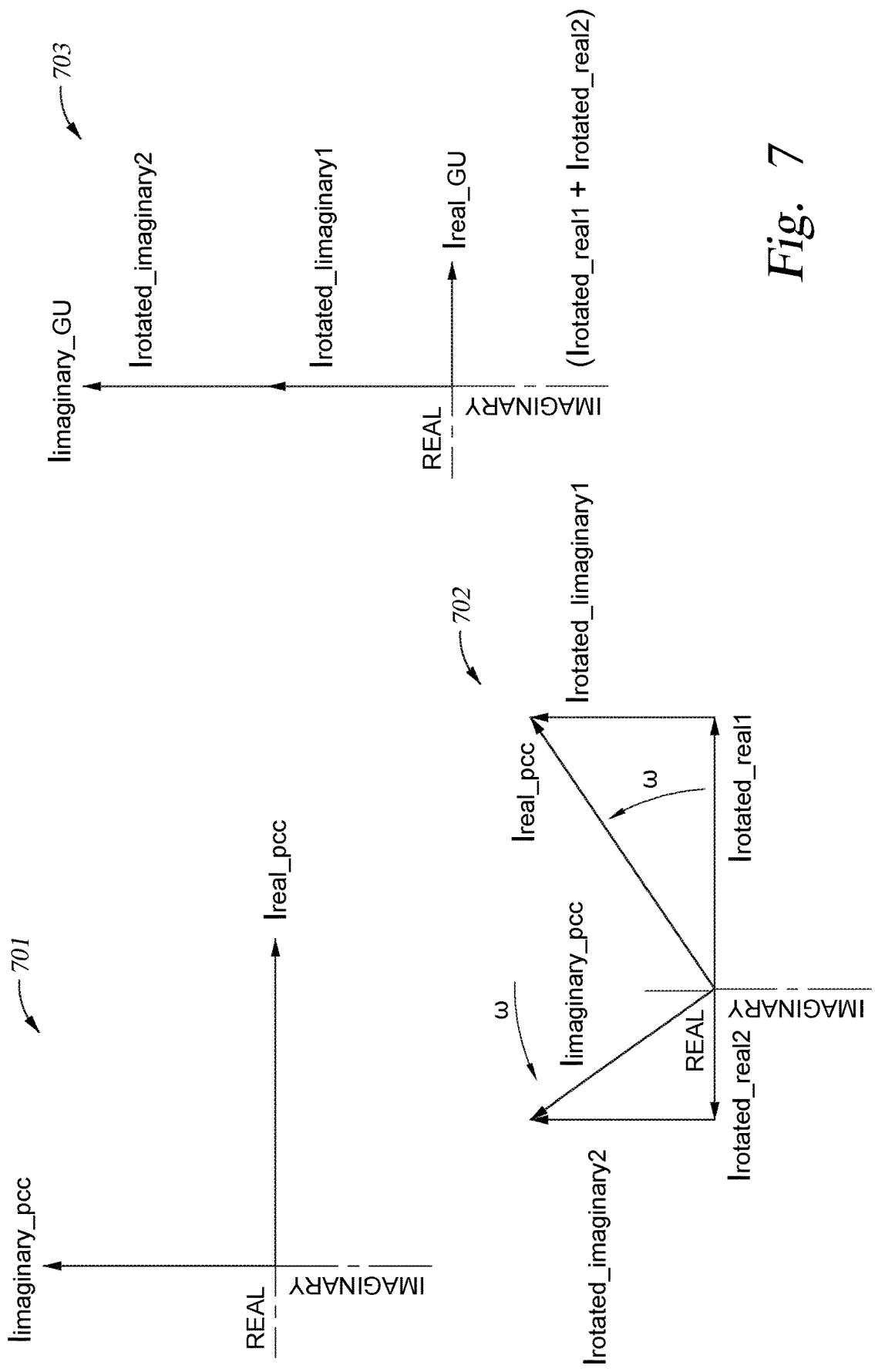
FIG. 7 provides visualizations for calculations discussed in reference to FIG. 6, according to embodiments of the present disclosure.

Block 660 may be understood with reference to FIG. 7, in which plant level set points in visualization 701 are rotated to generator side references in visualization 702 with new real and imaginary components. The new real and imaginary components are combined into the generator level set points in visualization 703.

Method 600 returns to block 610 from block 660 to repeat so that the power plant controller 118 continues to set and adjust current set points as the conditions in the electrical grid 120 and/or in the power plant 110 change over time. In this way, the power plant controller 118 provides feed forward control of the generator units 114 based on power conditions in the electrical grid 110, and receives feedback from the injectable current collected from the several generator units 114.

Figure 8:
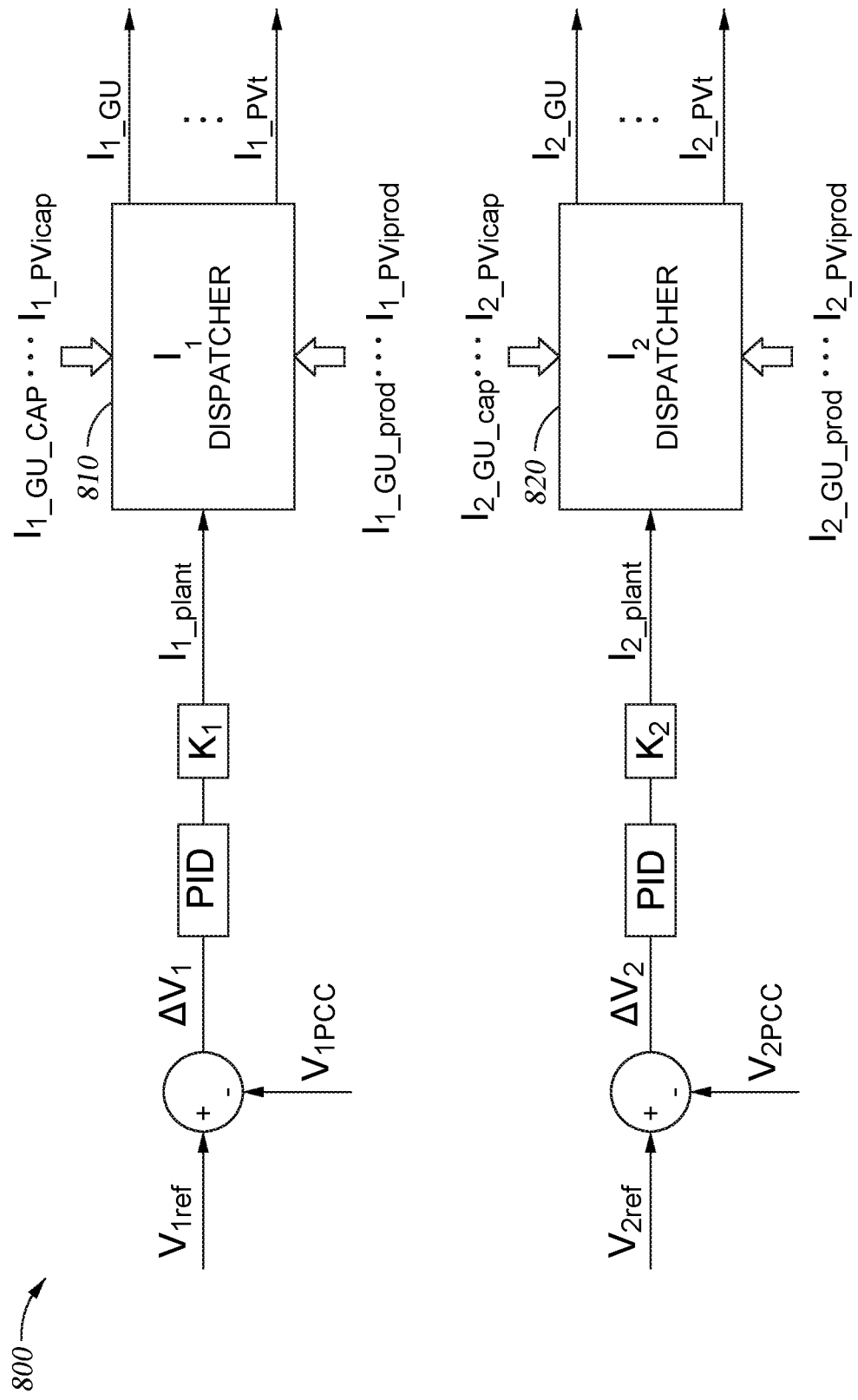
FIG. 8 illustrates a positive/negative set point dispatcher according to embodiments of the present disclosure.

FIG. 8 illustrates a positive/negative sequence current set point dispatcher 800 providing an additional current dispatching strategy described herein for unbalanced power plant operation situations. In some power systems, symmetry between the phases is maintained by large synchronous generators, which have a relatively low negative sequence reactance; however, modern wind turbines with frequency converters do not inherently have this feature. Many power plant controller's control algorithms assume that all the voltages and currents are symmetrical in the grid and the power plant. However the voltages and currents are unbalanced in many scenarios. If the balanced operation situation is always assumed, and the imbalances between the quantities are ignored, then the power plant controller's control would be inaccurate. Even small active/reactive power oscillations can happen and cause inaccuracies and inefficiencies in the control algorithm, especially when a power plant is integrated with a weak grid, as any insufficient reactive power or any extra reactive power injection can cause voltage instability. Therefore, it is necessary for the power plant voltage and/or current control to target at each individual phase or each individual positive or negative sequence component.

In the present disclosure several examples are given that focus on the positive or negative sequence component related current control strategy. Normally the positive sequence component voltage reference is 1 pu (per unit), and the negative sequence component voltage reference is 0. The power plant controller 118 calculates the voltage positive sequence component ($V_{1PCC}$) according and the voltage negative sequence component ($V_{2PCC}$) at the Point of Common Coupling according to Formula 9 and Formula 10 respectively. The power plant controller 118 calculates the voltage zero sequence component ($V_{0PCC}$) at the Point of Common Coupling according to Formula 11. In each of Formulae 9-11, the power plant controller 118 defines a (alpha) according to Formula 12.

$V_{1PCC} = (V_{aPCC} + \alpha V_{bPCC} + \alpha^2 V_{cPCC})/3$   [Formula 9]

$V_{2PCC} = (V_{aPCC} + \alpha^2 V_{bPCC} + \alpha V_{cPCC})/3$   [Formula 10]

$V_{0PCC} = (V_{aPCC} + V_{bPCC} + V_{cPCC})/3$   [Formula 11]

$\alpha = e^{j2\pi/3} = 1\angle 120°$   [Formula 12]

The control principle is embodied in the positive/negative sequence current set point dispatcher 800 illustrated in FIG. 8, which uses the calculated values for the voltage positive and voltage negative sequence components with the aggregated plan impedance to generate positive and negative sequence current set points. Because the zero sequence component of the current cannot pass through a Delta connected main transformer of a power plant 110, the zero sequence component of the voltage is ignored in this strategy. In FIG. 8, $K_1$ and $K_2$ are the gains between the voltage and the current in relation to positive and negative sequence components respectively. $K_1$ and $K_2$ reflect the plant aggregated impedance (Z) on positive sequence and negative sequence respectively, and $K_1$ and $K_2$ may be calculated or measured based on a Balance of Plant (BoP), as described herein. As shown in FIG. 8, $I_{1\_plant}$, as the plant level positive sequence current demand, and $I_{2\_plant}$, as the plant level negative sequence current demand, are obtained and sent to an $I_1$ dispatcher 810 and an $I_2$ dispatcher 820 respectively. The two dispatchers 810, 820 generate positive sequence component current set points ($I_{1\_GU}$) and negative sequence component current set points respectively ($I_{2\_GU}$), for individual generator units 114 based on the feedback from individual generator units 114 related to the positive and negative sequence component current production signals ($I_{1\_GU\_prod}$, $I_{2\_GU\_prod}$) and capacity signals ($I_{1\_GU\_cap}$, $I_{2\_GU\_cap}$).

This unbalanced current dispatching strategy can be used not only for the power plant asymmetry voltage scenarios, but also for power plant asymmetrical fault ride through scenarios.

Throughout the present disclosure, reference is made to embodiments presented. However, the scope of the present disclosure is not limited to specific described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments, and advantages described herein are merely illustrative and are not considered elements or limitations of the appended claims except where explicitly recited in a claim(s).

As will be appreciated by one skilled in the art, the embodiments disclosed herein may be embodied as a system, method, or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

The present disclosure may be practiced as a system, a method, and/or a computer program product. The computer program product may include a computer-readable storage medium (or media) (e.g., a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) having computer readable program instructions thereon for causing a processor to carry out aspects of the present invention.

Embodiments of the present disclosure are described with reference to flowchart illustrations and/or block diagrams of methods, apparatuses (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

The flowchart illustrations and block diagrams in the Figures illustrate the architecture, functionality and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block(s) may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A method for controlling a power plant including a plurality of generator units that are connected to an electrical grid at a single shared connection point, the method comprising:
    setting a reference frame for the plurality of generator units having a first axis and a second axis;
    measuring a demand of the electrical grid at the shared connection point, wherein the demand of the electrical grid comprises:
        an active power demand,
        a reactive power demand, and
        a voltage magnitude to supply to the electrical grid per a grid code;
    determining an active current required at the shared connection point based on the active power demand and the voltage magnitude;
    determining a reactive current required at the shared connection point based on the reactive power demand and the voltage magnitude;
    transforming the active current required and the reactive current required at the shared connection point to the reference frame where the first axis defines a first current set point and the second axis defines a second current set point; and
    dispatching at least one of the first current set point or the second current set point to generator controllers associated with each generator unit of the plurality of generators units.

2. The method of claim 1, wherein the reference frame is a direct-quadrature (dq) frame in which the first axis is formed by an active power as measured at the shared connection point and aligned with the voltage magnitude and the second axis is formed by a reactive power as measured at the shared connection point;
    wherein transforming the active current required and the reactive current required at the shared connection point further comprises:
        calculating a generator unit active voltage vector and a generator unit reactive voltage vector based on the voltage magnitude, the active current required, and the reactive current required at the shared connection point; and
        calculating the first current set point as an active current set point and the second current set point as a reactive current set point based on the generator unit active voltage vector and the generator unit reactive voltage vector.

3. The method of claim 2, wherein the first current set point and the second current set point are set for positive sequence currents and for negative sequence currents, wherein in response to the power plant operating in an unbalanced mode, the first current set point and the second current set point are set for positive sequence dq currents and for negative sequence dq currents.

4. The method of claim 2, wherein determining the active current required and the reactive current required at the shared connection point further comprises accounting for shunt impedances between the shared connection point and the plurality of generator units.

5. The method of claim 2, wherein the plurality of generator units includes wind turbine generators.

6. The method of claim 2, wherein a magnitude of the first current set point and the second current set point is an averaged magnitude based on the respective magnitude of active current required and magnitude of reactive current required at the shared connection point and a number of generator units included in the plurality of generator units such that each generator unit receives the same set point values.

7. The method of claim 6, wherein the magnitudes of the first current set point and the second current set point are adjusted at a particular generator unit of the plurality of generator units to stabilize a voltage level at the particular generator unit by raising the current set points when the voltage level is lower than a low voltage threshold and lowering the current set points when the voltage is higher than a high voltage threshold.

8. The method of claim 1, wherein the reference frame is a rotating reference frame, the method further comprising:
    synchronizing generator clocks of the generator controllers with a power plant controller clock of a power plant controller;
    mapping the active current required and the reactive current required at the shared connection point onto the first axis as the first current set point and onto the second axis as the second current set point based on the voltage magnitude; and rotating the rotating reference frame based on a frequency of the electrical grid to sync current produced by the plurality of generator units according to the first current set point and the second current set point with current demanded by the electrical grid at the shared connection point.

9. The method of claim 8, wherein synchronizing the generator clocks of the generator controllers further comprises one of:
   measuring a phase difference in electrical waves at the plurality of generator units and the shared connection point via Phasor Measurement Units (PMU) to synchronize the generator clocks and the power plant controller clock;
   transmitting a time specified by the power plant controller clock as a master clock signal to synchronize the generator clocks; and
   specifying an external clock that the generator clocks and the power plant controller clock are synchronized to.

10. A method for controlling a power plant including a plurality of generator units that are connected to an electrical grid at a single shared connection point, the method comprising:
   measuring a demand of the electrical grid at the connection point;
   calculating a plant level active current set point and a plant level reactive current set point based on the demand of the electrical grid;
   determining an active voltage vector and a reactive voltage vector for the plurality of generator units based on the plant level active current set point and the plant level reactive current set point;
   determining an angle based on a Power Factor at the shared connection point;
   determining a collective active current set point and a collective reactive current set point for the plurality of generator units based on the angle and the plant level active current set point and the plant level reactive current set point;
   individualizing, based on a number of generator units included in the plurality of generator units, the collective active current set point and the collective reactive current set point; and
   dispatching an individualized active current set point and an individualized reactive current set point to generator controllers associated with each generator unit of the plurality of generator units.

11. The method of claim 10, wherein measuring the demand of the electrical grid at the connection point includes measuring:
   an active power demand;
   a reactive power demand; and
   a voltage magnitude to supply the electrical grid per at least one grid code,
   wherein calculating the plant level active current set point and the plant level reactive current set point is based on the active power demand, the reactive power demand, and the voltage magnitude.

12. The method of claim 10, wherein measuring the demand of the electrical grid at the connection point provides feed forward control of the power plant.

13. The method of claim 10, wherein a power plant controller measures current injected into the electrical grid at the connection point to provide feedback control to the plurality of generator units.

14. The method of claim 10, wherein the individualized active current set point and the individualized reactive current set point are set for positive sequence currents and for negative sequence currents, wherein in response to the power plant operating in an unbalanced mode, the individualized active current set point and the individualized reactive current set point are set for positive sequence dq currents and for negative sequence dq currents.

15. The method of claim 10, wherein calculating the plant level active current set point and the plant level reactive current set point further comprises accounting for shunt impedances between the connection point and the plurality of generator units.

16. A method for controlling a power plant including a plurality of generator units that are connected to an electrical grid at a single shared connection point, the method comprising:
   generating a rotating reference frame for complex current demanded by the electrical grid with a first real axis and a second an imaginary axis;
   synchronizing clocks included in generator controllers associated with each generator unit of the plurality of generator units;
   measuring a demand of the electrical grid at the connection point, wherein the demand of the electrical grid comprises:
      an active power demand,
      a reactive power demand, and
      a voltage magnitude to supply to the electrical grid per a grid code;
   calculating, based on the voltage magnitude, the active power demand, and the reactive power demand, a needed current at the connection point and dividing the needed current into a first connection point value and a second connection point value; and
   dispatching the first connection point value and the second connection point value to the generator controllers, such that the generator controllers are enabled to rotate the reference frame to calculate a first generator side current set point and a second generator side current set point and set an associated generator unit accordingly.

17. The method of claim 16, wherein measuring the demand of the electrical grid at the connection point provides feed forward control of the power plant.

18. The method of claim 16, wherein a power plant controller measures current injected into the electrical grid at the connection point to provide feedback control to the plurality of generator units.

19. The method of claim 16, wherein synchronizing the clocks included in the generator controllers associated with each generator unit of the plurality of generator units further comprises one of:
   measuring a phase difference in electrical waves at the plurality of generator units and the shared connection point via Phasor Measurement Units (PMU) to synchronize the clocks and a power plant controller clock of a power plant controller;
   transmitting a time specified by the power plant controller clock as a master clock signal to synchronize the clocks; and
   specifying an external clock that the clocks and the power plant controller clock are synchronized to.

20. The method of claim 16, wherein the plurality of generator units includes wind turbine generators.

* * * * *